(12) United States Patent
Getin et al.

(10) Patent No.: US 9,864,193 B2
(45) Date of Patent: Jan. 9, 2018

(54) COMPACT HEAD-UP DISPLAY HAVING A LARGE EXIT PUPIL

(71) Applicant: COMMISSARIAT A L'ENERGIE ATOMIQUE ET AUX ENERGIES ALTERNATIVES, Paris (FR)

(72) Inventors: Stéphane Getin, Grenoble (FR); Henry Doyeux, Beaucroissant (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 530 days.

(21) Appl. No.: 14/396,875

(22) PCT Filed: Apr. 24, 2013

(86) PCT No.: PCT/FR2013/050907
§ 371 (c)(1),
(2) Date: Oct. 24, 2014

(87) PCT Pub. No.: WO2013/160613
PCT Pub. Date: Oct. 31, 2013

(65) Prior Publication Data
US 2015/0301334 A1    Oct. 22, 2015

(30) Foreign Application Priority Data
Apr. 24, 2012 (FR) ...................................... 12 53725

(51) Int. Cl.
*G02B 27/01* (2006.01)
*G02B 5/28* (2006.01)
*G02B 27/10* (2006.01)

(52) U.S. Cl.
CPC ........... *G02B 27/0101* (2013.01); *G02B 5/28* (2013.01); *G02B 27/1066* (2013.01); *G02B 2027/0123* (2013.01); *G02B 2027/0147* (2013.01)

(58) Field of Classification Search
CPC .......... G02B 27/01; G02B 5/28; G02B 20/27; H01L 27/25
See application file for complete search history.

(56) References Cited

U.S. PATENT DOCUMENTS

2008/0204663 A1*  8/2008  Balogh .............. G02B 27/2214
                                                                     353/10
2012/0218641 A1*  8/2012  Kikuchi ............... G02B 3/0056
                                                                     359/619

FOREIGN PATENT DOCUMENTS

EP         196811        4/2002
JP         4769912       9/2011
(Continued)

OTHER PUBLICATIONS

EPO, International Search Report for PCT/FR2013/050907, dated Jul. 22, 2013 (English Translation).
(Continued)

*Primary Examiner* — Sultan Chowdhury
*Assistant Examiner* — Danell L Owens
(74) *Attorney, Agent, or Firm* — Kevin R. Erdman; Brannon Sowers & Cracraft PC

(57) ABSTRACT

The invention relates to a head-up display including an element (10) suitable for overlaying a first image of a scene (14) on a second image from a projection system, the projection system including a screen (24) and an optical system (26), the screen (24) being divided into sub-screens (24A, 24B, 24C), each of which display the second image, the optical system (26) including a set of optical subsystems (26A, 26B, 26C) positioned opposite each sub-screen (24A,
(Continued)

24B, 24C), the screen being positioned within the object focal plane of each optical sub-system (26A, 26B, 26C).

20 Claims, 3 Drawing Sheets

(56) References Cited

FOREIGN PATENT DOCUMENTS

| WO | WO0248755 | 6/2002 |
|----|-----------|--------|
| WO | WO2005/117458 | 12/2005 |
| WO | WO2005117458 | 12/2005 |

OTHER PUBLICATIONS

EPO, International Search Report for PCT/FR2013/050907, dated Jul. 22, 2013.

* cited by examiner

COMPACT HEAD-UP DISPLAY HAVING A LARGE EXIT PUPIL

CROSS-REFERENCE TO RELATED APPLICATIONS

The present application is a National Stage of PCT International Application Serial Number PCT/FR2013/050907, filed Apr. 24, 2013, which claims priority under 35 U.S.C. §119 of French Patent Application Ser. No. 12/53725, filed Apr. 24, 2012, the disclosures of which are incorporated by reference herein.

BACKGROUND OF THE INVENTION

Field of the Invention

The present invention relates to a head-up display, also sometimes referred to as a head-up viewer, head-up collimator or head-up visualization system. More particularly, the present invention relates to a compact head-up display having a large exit pupil.

Description of the Related Art

Head-up displays, also known as HUDs, are augmented reality display systems which enable to integrate information on a real scene seen by an observer. In practice, such systems may be placed in the cockpit of a plane or in the interior of a vehicle. They are thus positioned at a distance of a few tens of centimeters from the user's eyes.

FIG. 1 schematically illustrates the operation of such a device.

A beam splitter 10 is placed between the eye of user 12 and a scene to be observed 14. The objects of the scene to be observed are generally located at infinity or at a long distance from the observer. Beam splitter 10 is placed according to an angle relative to the axis between scene 14 and observer 12, for example, 45°, to transmit the information originating from scene 14 to observer 12, without altering this information.

To project an image seen at the same distance as the real image of the scene, and to overlay it thereon, a projection system is provided. This system comprises an image display element 16, for example, a screen, located at the object focal point of an optical system 18. This image displayed on the screen, which is to be projected on the scene, is thus collimated to infinity by the optical system.

The projection system is placed perpendicularly to the axis between the scene and the observer so that the beam originating from optical system 18 reaches beam splitter 10 perpendicularly to this axis. The beam originating from optical system 18 thus reaches beam splitter 10 with a 45° angle relative to its surface.

Beam splitter 10 combines the image of scene 14 and the image originating from projection system 16-18, whereby the observer visualizes, without having to make any accommodative effort, an image comprising the projected image overlaid on the image of scene 14. This enables to limit the visual fatigue of the observer and to improve its decision making rapidity with the projected information.

To visualize the image projected by projection system 16-18, the observer's eye should be placed in the reflection area of the beam originating from optical system 18 on splitter 10. An important constraint to be respected is to take into account the possible motions of the user's head in front of the projector, and thus to provide the largest possible beam at the exit of optical system 18. In other words, an optical system 18 having a large exit pupil, for example in the range from a few centimeters to a few tens of centimeters, should be provided, so that the observer's head motions do not imply a loss of the projected information.

Another constraint of head-up systems is to provide a relatively compact device. Indeed, significant bulk constraints bear on these devices, particularly when they are used in plane cockpits or in the interior of vehicles of limited volume.

FIG. 2 is an enlargement of the projection system of FIG. 1, comprising a screen 16 and an optical system 18. Screen 16 is formed of pixels 20 arranged in an array. The distance separating screen 16 from optical system 18 is equal to object focal distance f of optical system 18.

The angular resolution of the projection system is defined as being the inverse of the tangent of the ratio of the size of a pixel tpix to focal distance f of optical system 18 in the above configuration (as a first approach, the angular resolution is equal to angle $\theta$ in FIG. 2). For a proper reading of the information projected by the screen, the angular resolution should be smaller than that of the eye, that is, smaller than 1 mrad. To obtain such an angular resolution, with a pixel size imposed by current technologies (having a lower limit in the range from a few micrometers to a few tens of micrometers), reasonable angular resolutions are obtained for optical system focal distances in the order of a few centimeters.

To further decrease the angular resolution of the screen, the only adjustable variable is the focal distance. However, for compactness reasons, the focal distance cannot be preferably increased beyond a few centimeters.

It is further known that the complexity of an optical system depends on the exit aperture thereof, that is, on the ratio of the diameter of the exit pupil of the device to the object focal distance of the system. More particularly, the larger the aperture of a device, the more complex the device. The more complex the optical system, the larger the number of lenses that it contains, particularly to limit the different geometric aberrations.

The relation between aperture and complexity is described in Warren J. Smith's work entitled "Modern Lens Design" (SPIE Press, 2005, p. 42), having its drawing of page 42 copied in FIG. 3.

FIG. 3 is a graph showing known optical systems classified according to the inverse of their aperture (F/#) and according to the desired full field angle. In this graph, it can be seen that, for a given field angle, the larger the aperture, the more complex the optical system. For example, for small field angles and small apertures, simple parabolic lens systems ("ACHROMATIC DOUBLET") are adapted. For head-up systems, it is generally desired to obtain a full field angle in the range from 20 to 30°. Current complex optical systems (for example, Petzval or "DOUBLE GAUSS"-type lenses) enable to obtain a maximum aperture in the order of 1.

In head-up displays, a highly compact system is desired to be obtained (object focal distance smaller than a few centimeters) with a system exit pupil of significant size (from a few centimeters to a few tens of centimeters). Such a system thus has a very large aperture, greater than 1. However, as has just been seen with the graph of FIG. 3, such a configuration cannot be obtained, in practice, even by using a very large number of elementary optical systems.

Further, even if optical systems could enable to obtain such an aperture, the forming of such a highly-complex optical system 18, and thus comprising many elementary optical elements, would be incompatible with the requested compactness of a head-up display.

Thus, there currently is no simple device having an exit pupil of significant size while being compact.

SUMMARY

An object of an embodiment of the present invention is to provide a compact head-up display having an exit pupil of significant size.

Another object of an embodiment of the present invention is to provide such a device which is easy to manufacture.

Thus, an embodiment of the present invention provides a head-up display comprising an element capable of overlaying a first image of a scene with a second image originating from a projection system, the projection system comprising a screen and an optical system, the screen being divided into sub-screens each displaying the second image, the optical system comprising an assembly of optical sub-systems placed opposite each sub-screen, the screen being placed in the object focal plane of each optical sub-system.

According to an embodiment of the present invention, each sub-screen associated with a corresponding optical sub-system forms a projection sub-module, the projection sub-modules having an identical angular resolution and field angle.

According to an embodiment of the present invention, the element capable of combining the first and second images is a beam splitter or an interference filter.

According to an embodiment of the present invention, the screen comprises an array of pixels formed on a same support, the sub-screens being made of portions of the screen.

According to an embodiment of the present invention, each pixel of the screen comprises an organic light-emitting diode.

According to an embodiment of the present invention, the display has an aperture smaller than or equal to 1.5.

According to an embodiment of the present invention, elements of the optical sub-systems most remote from the sub-screens are contiguous, to within 2 mm.

According to an embodiment of the present invention, elements of the optical sub-systems most remote from the sub-screens have hexagonal shapes and are arranged as a honeycomb.

According to an embodiment of the present invention, elements of the optical sub-systems most remote from the sub-screens have square shapes and are arranged in an array.

According to an embodiment of the present invention, each optical sub-system comprises a first and a second diopters.

According to an embodiment of the present invention, the first diopter has a radius of curvature in the range from 8 to 8.5 mm and an aspherization coefficient in the range from −0.8 to −0.9, and the second diopter of the optical system has a radius of curvature in the range from −45 to −46 mm and an aspherization coefficient smaller than 0.2.

An embodiment of the present invention further provides a method of manufacturing a head-up display such as hereabove, comprising the steps of: defining an angular resolution and a size of the screen pixels; calculating the focal distance of each of the optical sub-systems from the defined angular resolution; defining the number of pixels per sub-screen and the number of projection sub-modules according to a desired exit pupil size; and defining the structure of the optical sub-systems according to the desired focal distance and to the full field angle.

BRIEF DESCRIPTION OF THE DRAWINGS

The foregoing and other features and advantages will be discussed in detail in the following non-limiting description of specific embodiments in connection with the accompanying drawings, among which.

For clarity, the same elements have been designated with the same reference numerals in the different drawings and, further, as usual in the representation of optical systems, the various drawings are not to scale.

DETAILED DESCRIPTION

To obtain a compact head-up display, that is, having a bulk smaller than a few tens of centimeters, and having an exit pupil of significant size, it is provided to dissociate the projection system into a plurality of parallel projection sub-systems, each projection sub-system operating identically.

Figure 4:
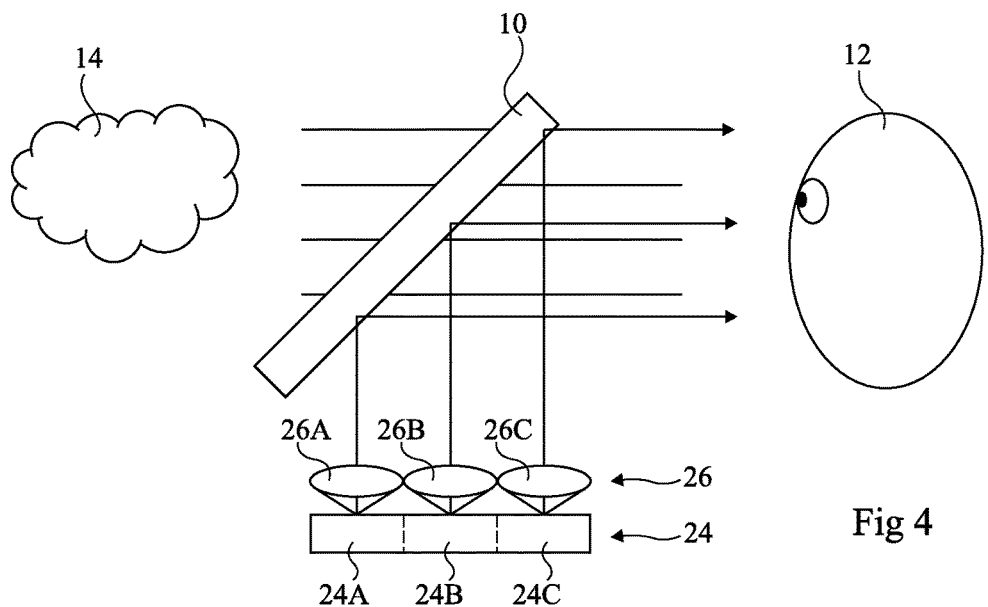
FIG. 4 illustrates a head-up display according to an embodiment of the present invention.

FIG. 4 shows a head-up display according to an embodiment.

In FIG. 4, the device comprises an element 10, called combiner, capable of overlaying the image of a scene with the image originating from a projection system. Combiner 10 is placed between observer 12 and a scene to be observed 14. Combiner 10 may be a beam splitter or an interference filter. The surface of combiner 10 forms an angle for example of 45° with the axis between the scene and the observer and does not disturb the arrival of rays from the scene to the observer.

A system of projection of an image to be integrated in the scene is provided. It comprises an image source 24, for example, a screen, associated with an optical system 26. The projection system is here placed perpendicularly to the axis between the scene and the observer and the beam which originates from optical system 26 reaches combiner 10 perpendicularly to this axis (and thus at a 45° angle from combiner 10).

Figure 1:
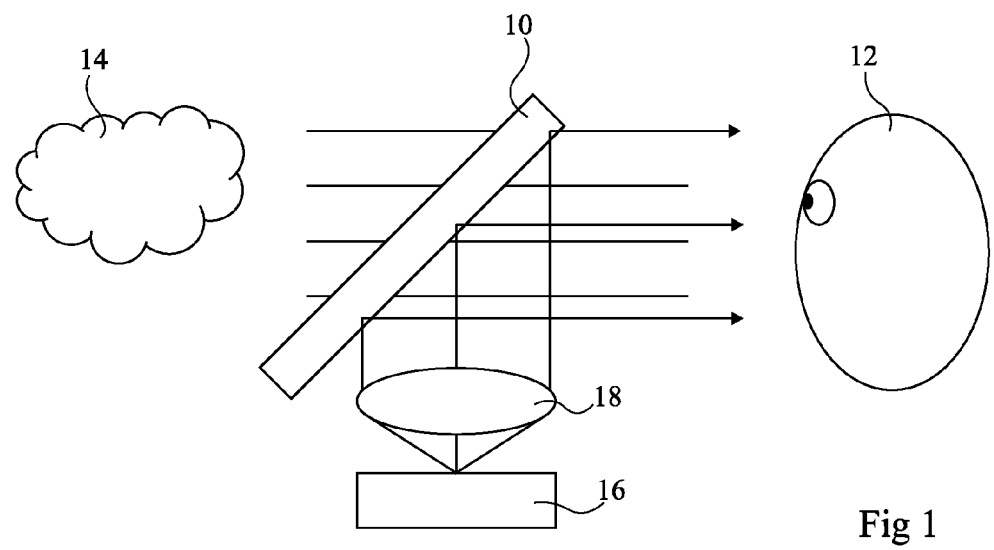
FIG. 1, previously described, illustrates the operating principle of a head-up display.
Figure 2:
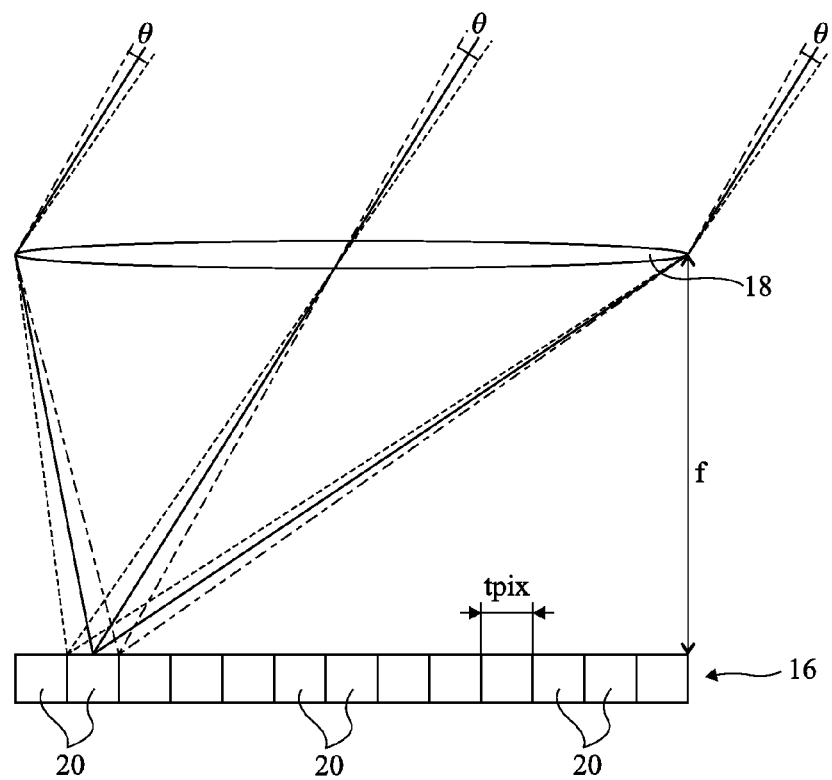
FIG. 2, previously described, illustrates a constraint applied to head-up displays.
Figure 3:
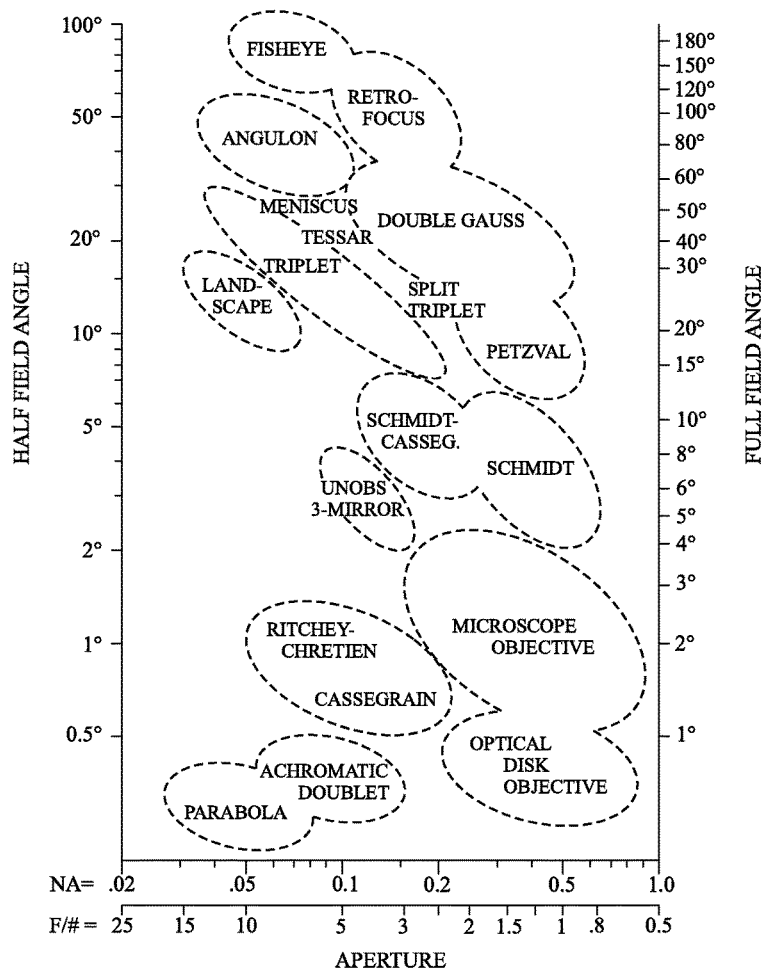
FIG. 3, previously described, is a graph showing the complexity of an optical system according to its aperture and to the full field angle.

Combiner 10 overlays the image of scene 14 and the projected image originating from optical system 26, whereby the observer visualizes the projected image overlaid on the real image of the scene. The system of FIG. 4 thus operates in the same way as the system of FIG. 1.

Screen 24 is separated into a plurality of sub-screens, preferably identical. In the cross-section view of FIG. 4, three sub-screens 24A, 24B, and 24C are shown. It should be noted that this number may be variable.

Each sub-screen is associated with an optical sub-system. Opposite each of sub-screens 24A, 24B, and 24C, optical system 26 separates into a plurality of optical sub-systems 26A, 26B, and 26C, respectively, preferably identical. Screen 24 is placed at a distance from optical system 26 equal to the object focal distance of each of optical sub-systems 26A to 26C. Each association of a sub-screen and of an optical sub-system forms a projection sub-module, or sub-projector. The projection system thus comprises a plurality of sub-projectors.

Screen 24 is provided so that each sub-screen 24A, 24B, 24C displays the same information. The beams originating from each of optical sub-systems 26A to 26C are thus identical, and collimated to infinity.

It should be noted that the projection sub-modules are advantageously identical. They may however be different from one another in terms of focal distance and of pixel size, from the time when they have an identical angular resolution and field angle. The field angle is defined as being the product of the number of pixels of the sub-screen and of the angular resolution of the concerned sub-module.

By forming a plurality of parallel sub-projectors, a complete device having a large total exit pupil (sum of the sizes of the exit pupils of each of the sub-projectors) may be obtained, while forming simple and compact optical sub-systems.

Indeed, each optical sub-system has a "moderate" so-called elementary aperture. The elementary aperture of an optical sub-system is defined as being the ratio of its specific focal distance to the dimension of its specific exit pupil. The parallel association of the sub-projectors thus provides an optical system having a particularly low aperture since, for a same distance between the screen and the projection optical element, a total exit pupil of significant size, equal to the sum of the exit pupils of each of the optical sub-systems, is obtained. The total optical system thus has a small aperture, smaller than 1.5, while being formed of simple elementary optical structures. The compactness of the complete device is thus ensured.

As an example, screen 24 may be formed of an array of cells comprising organic light-emitting diodes (OLED), or even of an array of LCD or cathode sub-screens.

Advantageously, screen 24, although it is divided into sub-screens 24A to 24C, may be formed of a single screen having its pixels separated to form the sub-screens. It may for example be provided to form twice two sub-screens on a complete OLED screen, or more than this.

To obtain a good readability of the information added on a scene by means of the head-up display of FIG. 4, the last lenses of each of optical sub-systems 26A to 26C (the lens most remote from the screen of each optical sub-system) are contiguous in top view, so that there is no space between the projected images and so that the user perceives the projected information in continuous fashion.

Of course, the contiguous character of the lenses is defined within the eye pupil tolerance limit. Thus, a small interval between lenses is acceptable, as long as it is not greater than the eye pupil, that is, as it is not greater than a few millimeters.

Figure 5:
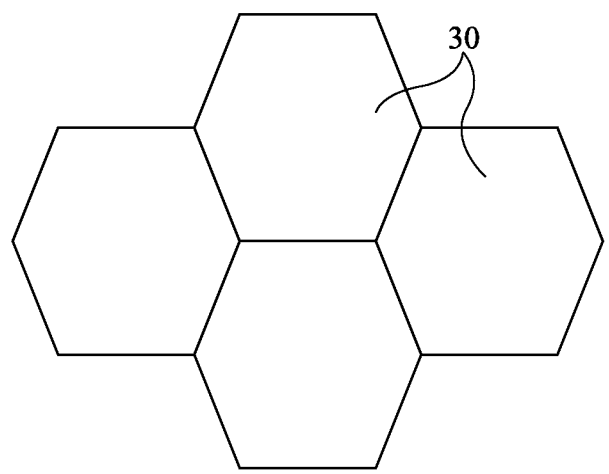
FIGS. 5 and 6 illustrate assemblies of optical sub-systems according to alternative embodiments of a display according to an embodiment of the present invention.
Figure 6:
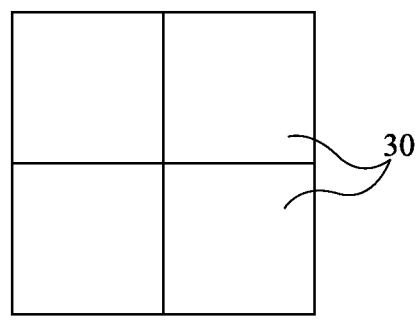

FIGS. 5 and 6 illustrate two possible configurations of the last lenses of each optical sub-system of FIG. 4, in top view.

In the example of FIG. 5, the upper lenses 30 of each optical sub-system 24A, 24B, 24C have hexagonal shapes, and are arranged as a honeycomb.

In the example of FIG. 6, the upper lenses 30 of each optical sub-system have square shapes, and are arranged in an array. It should be noted that other configurations are also possible.

Advantageously, the two above shapes are relatively simple to implement and to manufacture as compared with an OLED screen, for example, by conventional microlens manufacturing techniques.

Further, to minimize crosstalk effects between the projection sub-modules, instead of adding complex caches ("baffling" elements) which are expensive to integrate, advantage may be taken of the directivity of monochrome OLEDs, which are formed by means of a stack of a first optically-reflective metal electrode, of an assembly of transparent organic layers, and of a second semi-reflective electrode.

Such a stack forms a selective Fabry-Perot-type optical cavity, the wavelength area most favored by the cavity being set by the thickness of the organic layers (distance between the two mirrors). The selectivity of the cavity is adjusted by the transparency of the semi-reflective cathode mirror. In the case of a monochrome OLED cell (for example, green), a relatively selective cavity set on the OLED emission spectrum may be selected, which strongly decreases crosstalk phenomena between each of the sub-projectors.

To size the device, the following method will preferably be applied:
defining a desired angular resolution, as well as a pixel size compatible with available manufacturing methods;
calculating the focal distance of each of the optical sub-systems of each of the sub-projectors based on the desired angular resolution;
defining the number of pixels to be formed in each sub-screen and the number of projection sub-modules to be placed to form the compete projector, according to the size of the exit pupil which is desired to be obtained; and
defining the structure of the optical sub-systems (26A, 26B, 26C) according to the desired focal distance and to the full field angle.

As a numerical example of application, the device provided herein may comprise a screen 26 having pixels with sizes smaller than 300 µm, which may for example be in the range from 1 to 80 µm, preferably in the order of 5 µm. The total thickness of the projection system may be in the range from a few millimeters to a few centimeters. The field angle is here selected to be 10°.

The OLED cell may be formed by microelectronics methods, for example, such as described in Prache O.'s publication entitled "Active matrix molecular OLED microdisplays", published in 2001 in Displays 22 (p. 49-56).

Optical system 26 may be formed of 50×50 square lenses having a 2.5 mm side length, and thus having an exit pupil having a 125 mm side length, each sub-screen 24A, 24B, 24C having a 500×500-pixel definition, the total definition of screen 24 being 25,000×25,000 pixels. Each pixel for example has an emission wavelength of 535 nm.

Lenses forming the optical element of the projection device may be made of poly(methyl methacrylate), PMMA, by molding or by injection, or of any other adapted polymer material. This provides an average thickness of each optical element projection 26 in the order of one millimeter.

As an example, each optical sub-system 26A, 26B, 26C may comprise a first diopter having a radius of curvature in the range from 8 to 8.5 mm and an aspherization coefficient in the range from −0.8 to −0.9, and the second diopter having a radius of curvature in the range from −45 to −46 mm and an aspherization coefficient smaller than 0.2. In particular, the optical system may comprise a first diopter having a radius of curvature of 8.296 mm and an aspherization coefficient of −0.85. The second diopter of the optical system may have a radius of curvature of −45.73 mm and a zero aspherization coefficient. The rear surface of the lens array may be placed 13.66 mm (object focal distance) away from the screen. The projection module here has an aperture in the order of 0.1.

As an alternative embodiment, it may be provided to form the lenses of the projection system with glass instead of plastic material. Despite its high cost, such a configuration has the advantage of being adapted to temperature constraints which may be significant, particularly in a fighter aircraft cockpit (temperature differences capable of being in the range from −40° C. to 70° C.). Indeed, under such temperatures, the plastic provided hereabove risks deforming.

To counter deformations of the optical system associated with the screen over time, particularly when the latter is made of plastic, it may also be provided to place a system adapting the distance between the screen and the optical system when the focal length thereof varies. To detect a modification of the focal length of the device, an image detection system, for example, a camera comprising a few pixels, may be placed in line with the projection system and the beam splitter, opposite to the projection system with respect thereto. The camera detects whether the image projected by the projection system is properly collimated to infinity, and if this is not true, turns on a mechanical system enabling to bring optical system 26 closer to screen 24 or to draw them away from each other.

In practice, the mechanical system for bringing optical system 26 closer to screen 24 or for drawing them away from each other may be formed in any known fashion, for example, by means of a motor activating the displacement of a rack having the screen or the optical system attached thereto.

Specific embodiments of the present invention have been described. Various alterations and modifications will readily occur to those skilled in the art. Further, various embodiments with various variations have been described hereabove. It should be noted that those skilled in the art may combine various elements of these various embodiments and variations without showing any inventive step.

The invention claimed is:

1. A head-up display comprising a projection system and an element capable of overlaying a first image of a scene with a second image originating from said projection system, said projection system comprising a plurality of identical light-emitting sub-screens each emitting the same second image, each sub-screen being associated with an optical sub-system, all identical, thus forming a plurality of assemblies of one of the sub-screens and the associated optical sub-system, all the assemblies having parallel optical axes, each sub-screen being placed in the object focal plane of the associated optical sub-system.

2. The head-up display of claim 1, wherein each sub-screen associated with a corresponding optical sub-system forms a projection sub-module, each of the projection sub-modules having an identical angular resolution and field angle.

3. The head-up display of claim 1, wherein the element capable of combining the first and second images includes at least one of a beam splitter and an interference filter.

4. The head-up display of claim 1, wherein the assembly of sub-screens forms an array of pixels formed on a same support.

5. The head-up display of claim 4, further comprising a screen formed by the assembly of sub-screens, and wherein each pixel of the screen comprises an organic light-emitting diode.

6. The head-up display of claim 1, wherein each of the optical sub-systems have an elemental aperture smaller than or equal to 1.5.

7. The head-up display of claim 1, wherein elements of the optical sub-systems most remote from the sub-screens are contiguous to within 2 mm.

8. The head-up display of claim 1, wherein elements of the optical sub-systems most remote from the sub-screens have hexagonal shapes and are arranged as a honeycomb.

9. The head-up display of claim 1, wherein elements of the optical sub-systems most remote from the sub-screens have square shapes and are arranged in an array.

10. The head-up display of 1, wherein each optical sub-system comprises a first and a second diopters.

11. The head-up display of claim 10, wherein the first diopter has a radius of curvature in the range from 8 to 8.5 mm and an aspherization coefficient in the range from −0.8 to −0.9, and the second diopter of the optical system has a radius of curvature in the range from −45 to −46 mm and an aspherization coefficient smaller than 0.2.

12. A method of manufacturing the head-up display having a projection system and a screen comprising pixels from a plurality of sub-screens and associated optical sub-systems, comprising the steps of:
defining an angular resolution and a size of the pixels of the sub-screens;
calculating the focal distance of each of the optical sub-systems from said defined angular resolution;
defining the number of pixels per sub-screen and the number of projection sub-modules according to a desired exit pupil size; and
defining the structure of the optical sub-systems according to the desired focal distance and to the full field angle.

13. The head-up display of claim 2, wherein elements of the optical sub-systems most remote from the sub-screens are contiguous to within 2 mm.

14. The head-up display of claim 3, wherein elements of the optical sub-systems most remote from the sub-screens are contiguous to within 2 mm.

15. The head-up display of claim 4, wherein elements of the optical sub-systems most remote from the sub-screens are contiguous to within 2 mm.

16. The head-up display of claim 5, wherein elements of the optical sub-systems most remote from the sub-screens are contiguous to within 2 mm.

17. The head-up display of claim 6, wherein elements of the optical sub-systems most remote from the sub-screens are contiguous to within 2 mm.

18. The head-up display of claim 10, wherein elements of the optical sub-systems most remote from the sub-screens are contiguous to within 2 mm.

19. A head-up display comprising a projection system and an element capable of overlaying a first image of a scene with a second image originating from said projection system, said projection system comprising a plurality of identical light-emitting sub-screens each emitting the same second image, each sub-screen being associated with an optical sub-system, all identical, thus forming a plurality of assemblies of one of the sub-screens and the associated optical sub-system all the assemblies having parallel optical axes, each sub-screen being placed in the object focal plane of the associated optical sub-system, each sub-screen being associated with a corresponding optical sub-system forming a projection sub-module, each of the projection sub-modules having an identical angular resolution and field angle, the element capable of combining the first and second images including at least one of a beam splitter and an interference filter, the assembly of sub-screens forming an array of pixels formed on a same support, with a screen being formed by the assembly of sub-screens, with each pixel of the screen comprising an organic light-emitting diode, wherein each of the optical sub-systems have an elemental aperture smaller than or equal to 1.5, with the elements of the optical sub-systems most remote from the sub-screens being contiguous to within 2 mm and having one of a hexagonal and square shape and are arranged as one of a honeycomb and an array, with each optical sub-system comprising a first and a second diopter.

20. The head-up display of claim 19, wherein the first diopter has a radius of curvature in the range from 8 to 8.5 mm and an aspherization coefficient in the range from −0.8 to −0.9, and the second diopter of the optical system has a radius of curvature in the range from −45 to −46 mm and an aspherization coefficient smaller than 0.2.

* * * * *